United States Patent [19]

Sills

[11] Patent Number: 5,359,328
[45] Date of Patent: Oct. 25, 1994

[54] ANALOG PROCESSING SYSTEM

[76] Inventor: Richard R. Sills, 1085 Park Ave., New York, N.Y. 10128

[21] Appl. No.: 322,147

[22] Filed: Mar. 10, 1989

Related U.S. Application Data

[63] Continuation-in-part of Ser. No. 933,165, Nov. 20, 1986.

[51] Int. Cl.⁵ .................... H03M 1/00; H03M 1/06; G11B 5/00
[52] U.S. Cl. .................... 341/155; 341/126; 341/118; 341/110; 360/8
[58] Field of Search ............... 341/155, 126, 118, 110; 360/8

[56] References Cited

U.S. PATENT DOCUMENTS

| | | | |
|---|---|---|---|
| 3,697,957 | 10/1972 | Barron | 364/148 |
| 4,030,119 | 6/1977 | Ellis | 341/110 X |
| 4,149,256 | 4/1979 | Sumi et al. | 341/110 X |
| 4,150,433 | 4/1979 | Kaniel | 341/126 X |
| 4,479,241 | 10/1984 | Buckley | 364/153 X |

Primary Examiner—Sharon D. Logan
Attorney, Agent, or Firm—Jordan and Hamburg

[57] ABSTRACT

An information processing system includes a digital computing system, an analog processing device with an arrangement for converting electrical information to information of analog form, and an arrangement responsive to the analog information energy for producing output electrical information. Output data from the digital computing system is applied to the analog processing system via a D/A converter, and an A/D converter applies the output electrical information to the digital computing system. Data modified by the analog processing system may be employed to supplement data applied thereto in a random manner, or in a manner with a known transfer function, in order to introduce perturbations in the data to aid in subsequent processing thereof in the digital computing system.

16 Claims, 9 Drawing Sheets

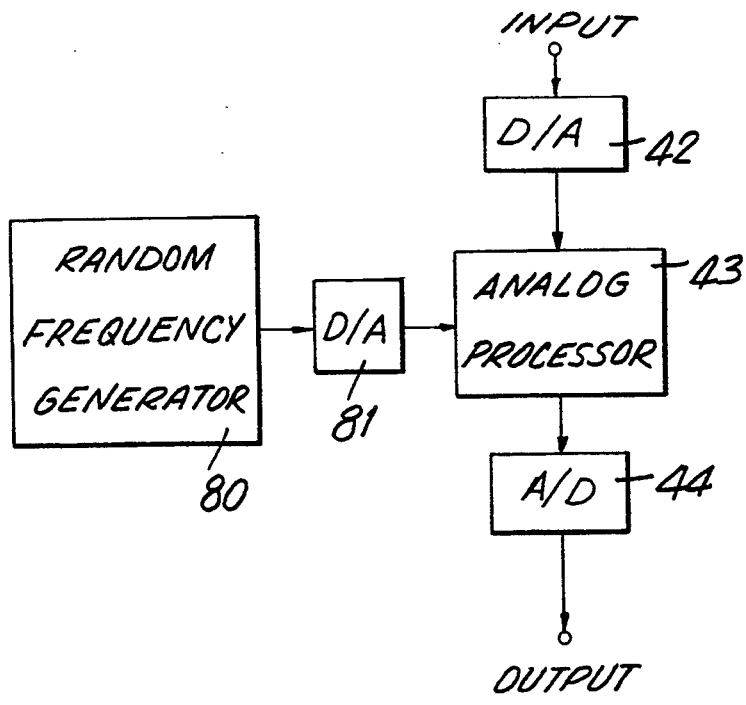
FIG. 8
FIG. 13
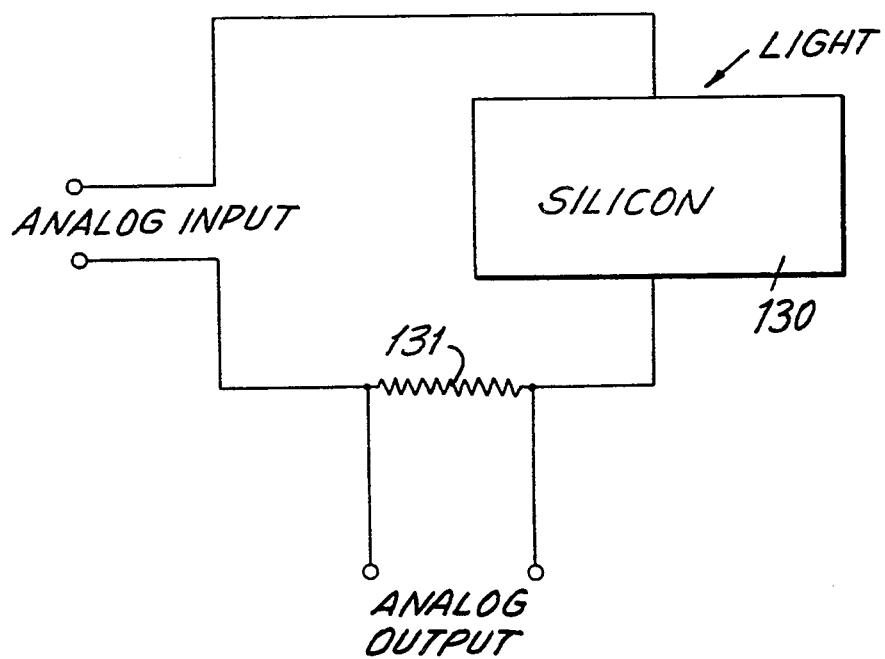

ANALOG PROCESSING SYSTEM

RELATED APPLICATIONS

This application is a combination-in-part of my co-pending application Ser. No. 933,165 filed Nov. 20, 1986.

FIELD OF THE INVENTION

This invention is directed to the provision of an analog processing system adapted for coupling to a digital processing system, for example a microcomputer, in order to enhance the processing capabilities of the system.

BACKGROUND OF THE INVENTION

In conventional data processing systems, data is treated by predetermined programs, so that the result of the processing of the data is always predictable, even though it may be complex and hence predictable only with difficulty. This result occurs since the data processing system has employed one or more fixed algorithms in the processing of the data.

As discussed in my Application Ser. No. 933,165, the method and apparatus of the invention are especially adapted for use in artificial intelligence systems. The various prior art publications cited therein are encorporated herein by reference.

SUMMARY OF THE INVENTION

Briefly stated, the invention provides an information processing system comprising a digital computing system, an analog processing device comprising means for converting electrical information to information of analog form, and means responsive to the analog information energy for producing output electrical information. A digital-to-analog converter applies output data from the digital computing system to the analog processing system, and analog-to-digital converter applies the output electrical information to the digital computing system.

By using an analog device for modification of the data, the data may be modified in a not completely predictable manner, or at least a not readily predictable manner. Thus, in accordance with the invention, the information that is applied to the device is known. The device introduces a variability to the information that, while perhaps determinable from a knowledge of the information and the device, is not readily capable of being produced by a computer program operating on the same data. The system in accordance with the invention is thus useful in the type of situation where the computer does not have sufficient information stored in its memory banks to solve a given problem, since the analog area can introduce a variability to the stored information. Consequently, if input data is received that cannot be directly processed due to lack of conformance to stored data requirements, perturbations may be introduced into the data that may result in processable data that can be processed and learned.

The analog processing system, or analog area, may be coupled to the microcomputer system via conventional digital to analog and analog to digital conversion devises, and the microcomputer is provided with conventional I/O devices and memory. The input devices may include various sensing devices, including, for example, smell, taste, visual, data and voice inputs, and the output devices may include visual, data and voice output device. The memory may include memory banks for the necessary processing, such as linguistic banks, mathematical banks, historical banks, etc.

The analog area comprises a signal processor, receives information or data from the microcomputer, and returns information or data to the microcomputer. The analog area modifies the data for return to the microcomputer, the type of modification being of course dependent upon the type of analog area employed.

For example, in a learning process, data is applied to the analog area. The analog area reacts to the data in a manner dependent upon the data and upon the analog area itself, to return the modified data. Thus, if one type of data is applied to the device that may be considered to the "incorrect" data, the device may react thereto, in accordance with the transfer function of the device, to provide output data that indicates to the microprocessor that the input data was incorrect. The microprocessor program must then direct other data to the device, following for example a give program, until the device responds with data indicating that a "correct" data had been applied thereto.

The primary concept of the invention, then, resides in the use of an analog device, for example of the above type, for processing data received from a digital computer, in order to introduce a variability or perturbation in the information, so that the computer can employ the modified information in obtaining solutions that could not be achieved merely by the use of a preset program.

BRIEF DESCRIPTION OF THE DRAWING

In order that the invention may be more clearly understood, it will no be disclosed in greater detail with reference to the accompanying drawing, wherein:

FIG. 8 is a diagram of a modification of the process of FIG. 7;

FIG. 13 illustrates an analog area in accordance with invention that employs a photoconductor;

DETAILED DISCLOSURE OF THE INVENTION

Figure 1:
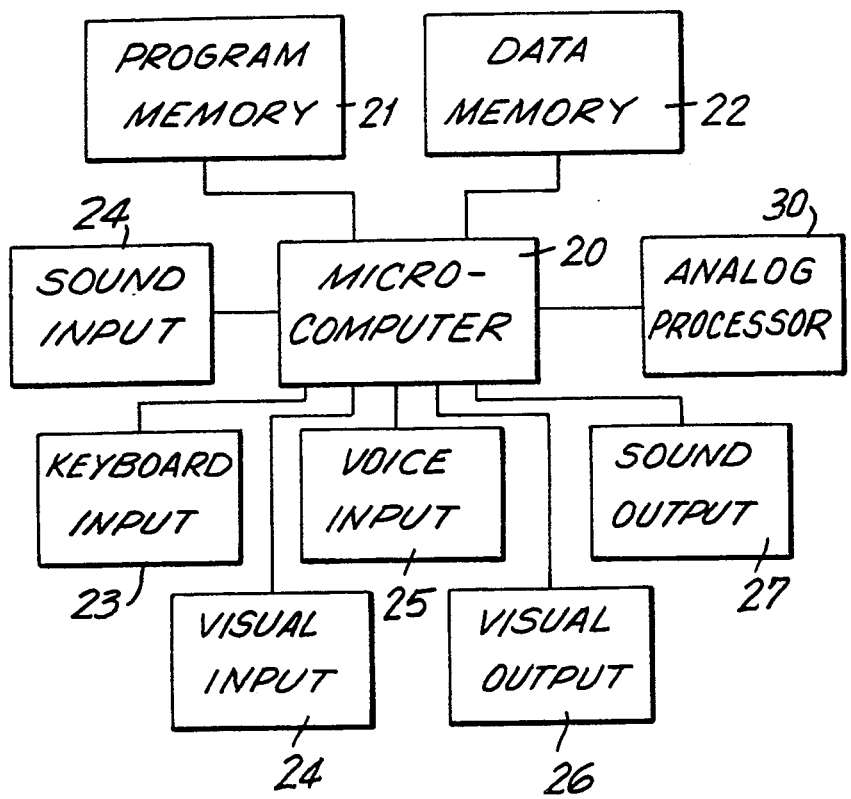
FIG. 1 is a block diagram of a microcomputer system employing an analog processor, in accordance with one embodiment of the invention.

FIG. 1 illustrates generally a system which may encorporate the method and apparatus of the invention. A conventional microcomputer 20 is provided with program memory 21, data memory 22 and a keyboard input 23, in the conventional manner. In addition, other input and output devices may be coupled to the microcomputer, depending upon the specific application of the invention. For example, a visual input device may be comprised of visual sensors, such as one or more CCD's, a sound input device 24 such as an ultrasonic detector, a voice input device 25, a visual output device 26 such as a screen, and a sound output device 27. In addition, in accordance with the invention, the microcomputer 20 is coupled to an analog processor 30, which will be discussed in greater detail in the following paragraphs.

It is of course apparent that other sensory inputs may be employed in accordance with the invention, such as, for example only, tactile sensing device, taste sensing device, odor sensing devices, resistance sensing devices, as well as text input devices.

Figure 2:
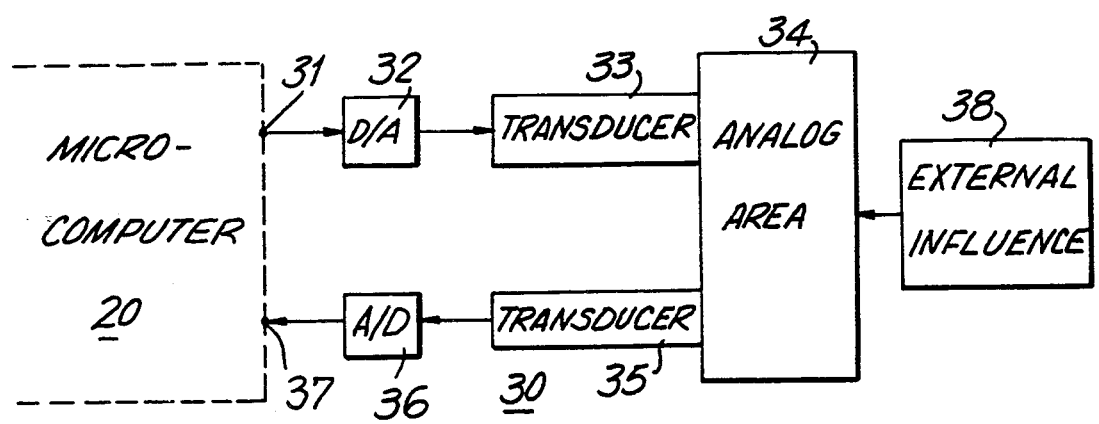
FIG. 2 is a block diagram of an analog processor, in accordance with the invention.

The general form of an analog processor 30 in accordance with the invention is illustrated in FIG. 2. In this arrangement, digital signals output from an output port 31 of the microcomputer are converted to analog form in a conventional digital-to-analog converter 32, the analog signals being applied to a transducer 33 coupled to an "analog area" 34. This area constitutes a region or device adapted to act upon analog signal, and embodiments thereof will be disclosed in greater detail in the following paragraphs. An analog output of the analog area is provided by transducer 35, and applied to the analog-to-digital converter 36 for application to the digital port 37 of the microcomputer. The analog area is preferably, but not necessarily, subject to an external influence 38.

The analog area 34 is adapted to influence the analog signals applied thereto in a given manner, which may be random, pseudorandom or in accordance with one or more algorithms, so that the signals applied to the port 37 are modifications of the signals output from port 31.

Figure 3:
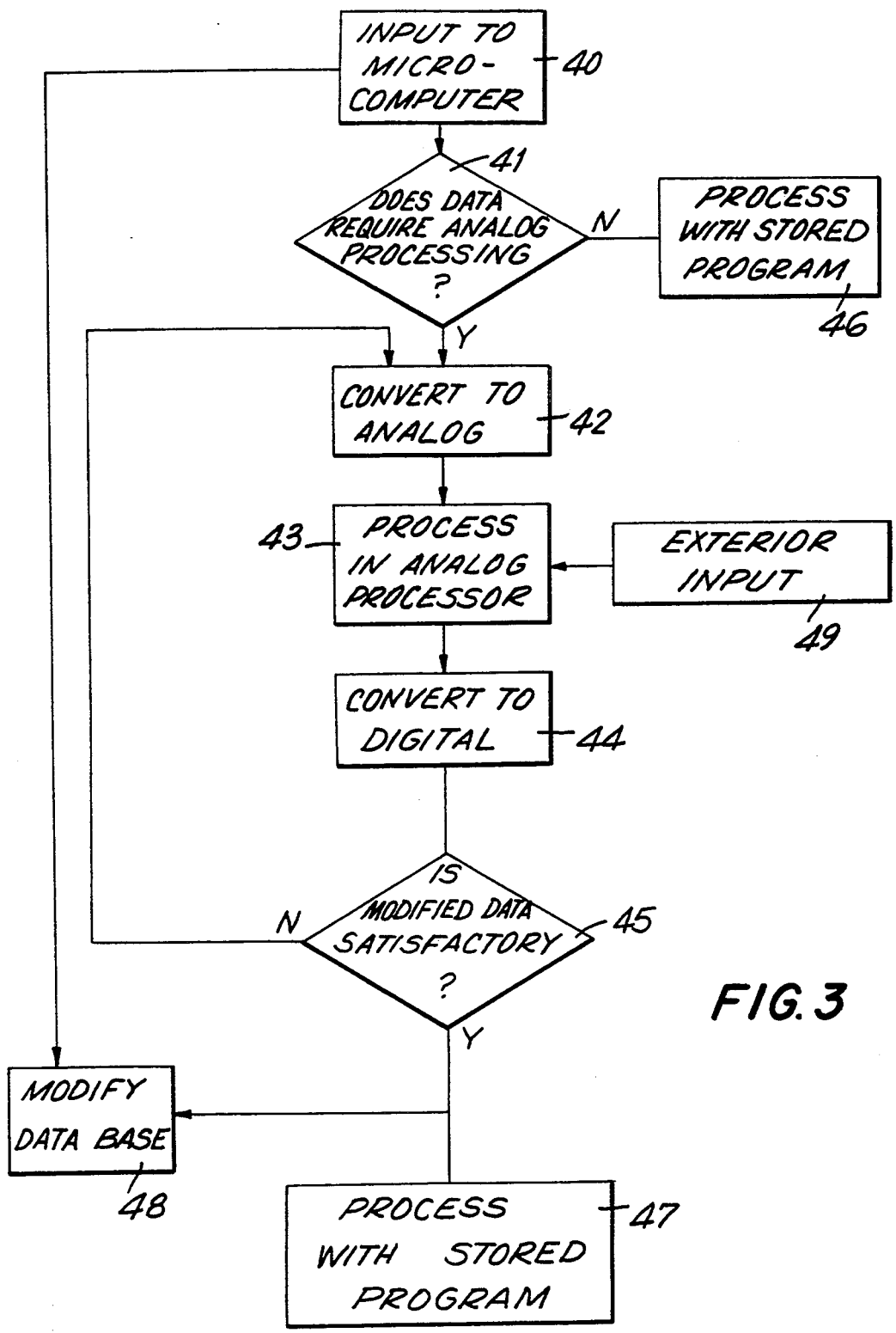
FIG. 3 is a flow diagram of one process in accordance with the invention.

FIG. 3 illustrates a generalized flow diagram for processing in accordance with one embodiment of the invention, employing an analog processor. The process is directed to a solution to a processing program that exists when input data does not conform for some reason to data stored in the computer, so that the microcomputer cannot readily process the data. This may occur, for example, in a recognition system in which it has not been feasible to store all possible input conditions, or if input conditions have changed in an unforeseeable manner so that the processing of data becomes difficult or impossible.

As illustrated in FIG. 3, the input data 40, in digital form or converted to digital form, is tested at block 41 to determine if it corresponds to data that can be processed or recognized. If not, it is converted to analog form at block 42, processed in analog form at block 43 in an analog processor in accordance with the invention, and reconverted to digital form at block 44. The modified data is now tested, at block 45, to determine if it can be recognized or processed by the digital system. If not, the modified data is reintroduced to the digital to analog converter for further modification. If the unmodified data or modified data is accepted for processing by the digital system, it is processed normally, in accordance with the stored program, at blocks 46, 47, respectively.

In accordance with a further feature, if the data is acceptable for processing after modification, the input data prior to such modification may be added to the data base at block 48, the system thereby learning that such data is now acceptable without analog processing.

FIG. 3 further illustrated that the analog processor may be provided with an additional input device or system 49, for controlling the transfer function of the analog device in a random or determinable manner.

Figure 4:
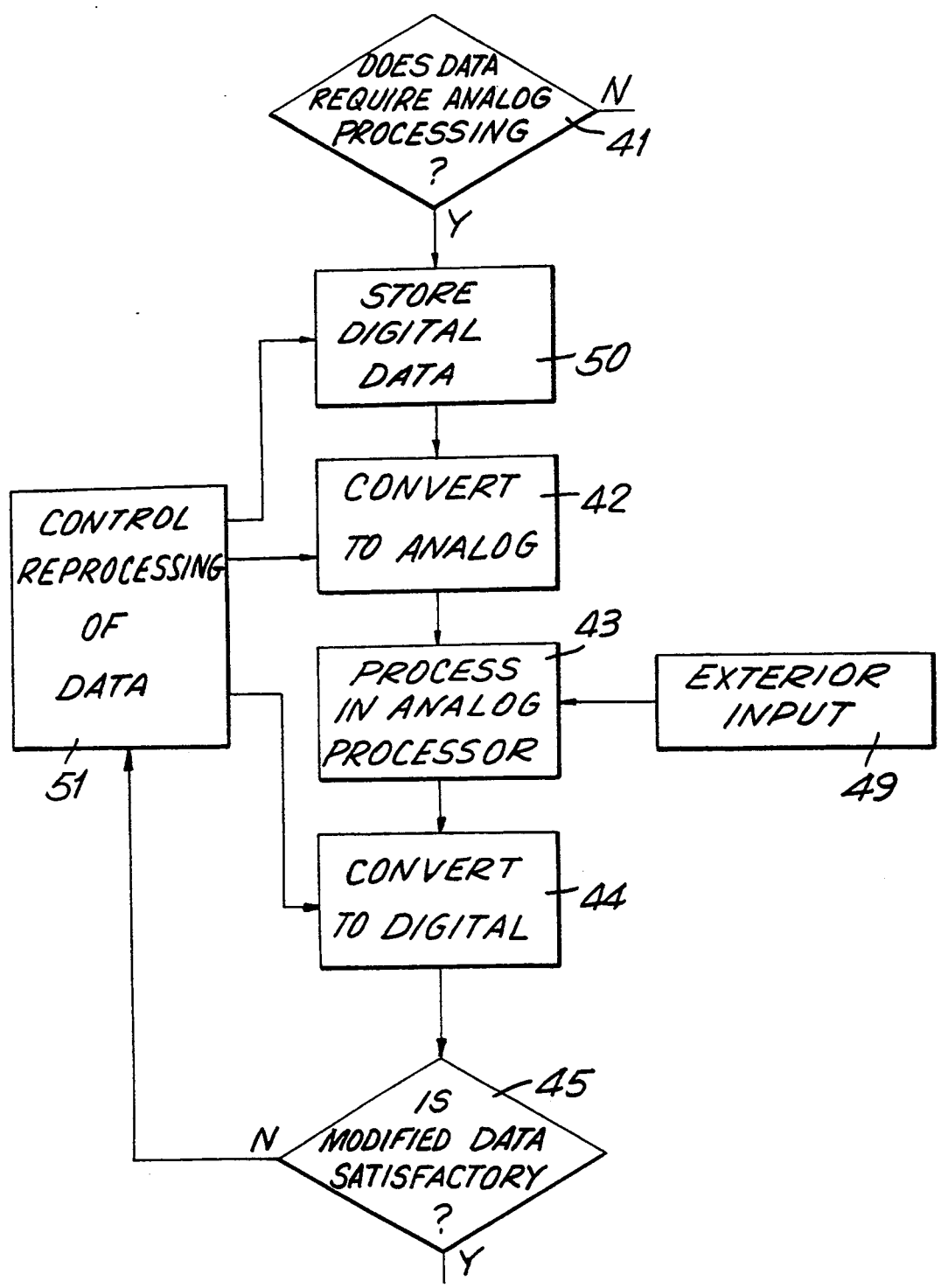
FIG. 4 is a flow diagram of a modification of the process of FIG. 3.

A modification of a portion of the process of FIG. 3 is illustrated in FIG. 4, wherein the unmodified data is initially stored at block 50 and, if the modified data is not suitable for processing, the system is controlled by block 51 to reprocess the unmodified stored data. This process of course assumes that the transfer function of the analog processing is random or a changes in other manners as a function of time.

Figure 5:
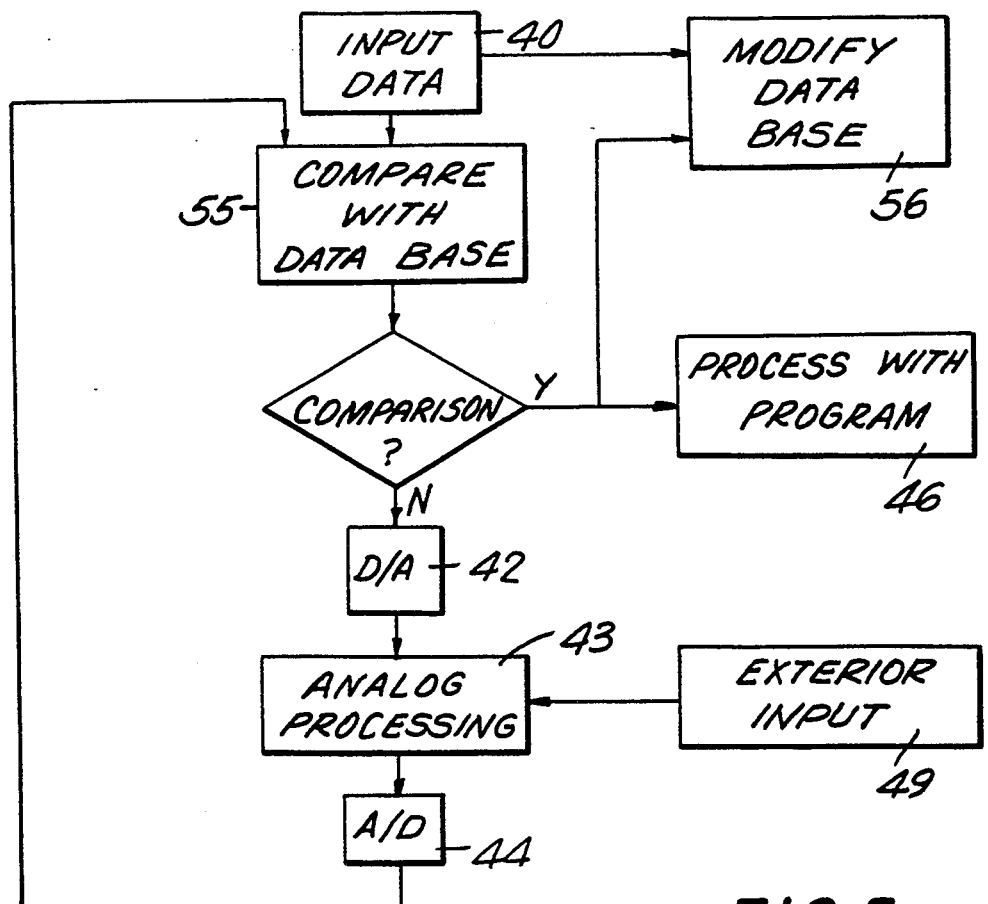
FIG. 5 is a flow diagram of a further process in accordance with the invention.

A still further modification of the process is illustrated in FIG. 5, wherein the input data is compared with data base, at block 55 so that the data base may be modified, at block 56, if necessary, upon any successful comparison.

Figure 6:
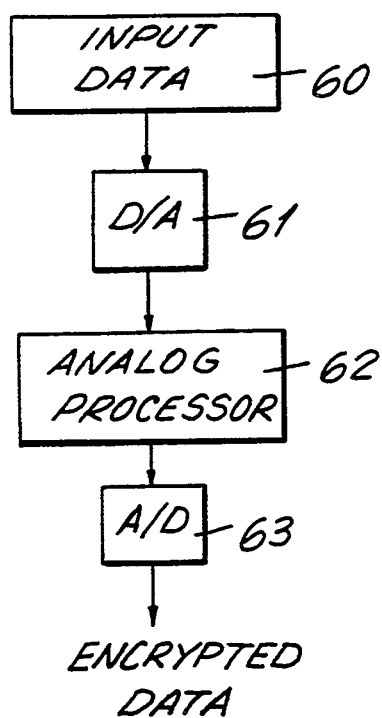
FIG. 6 is a flow diagram of another process in accordance with the invention.

FIG. 6 illustrates a further process in accordance with the invention, wherein the input data is applied directly to the digital-to-analog converter 61, or via the microcomputer in modified or unmodified form, for processing by the analog processor 62. The modified analog data is reconverted to digital form in block 63, to provide the system output. In this embodiment of the invention, the transfer function of the analog processor is either known or reproducible. The output may thus comprise an encryption of the input data that is capable of being decrypted.

Figure 7:
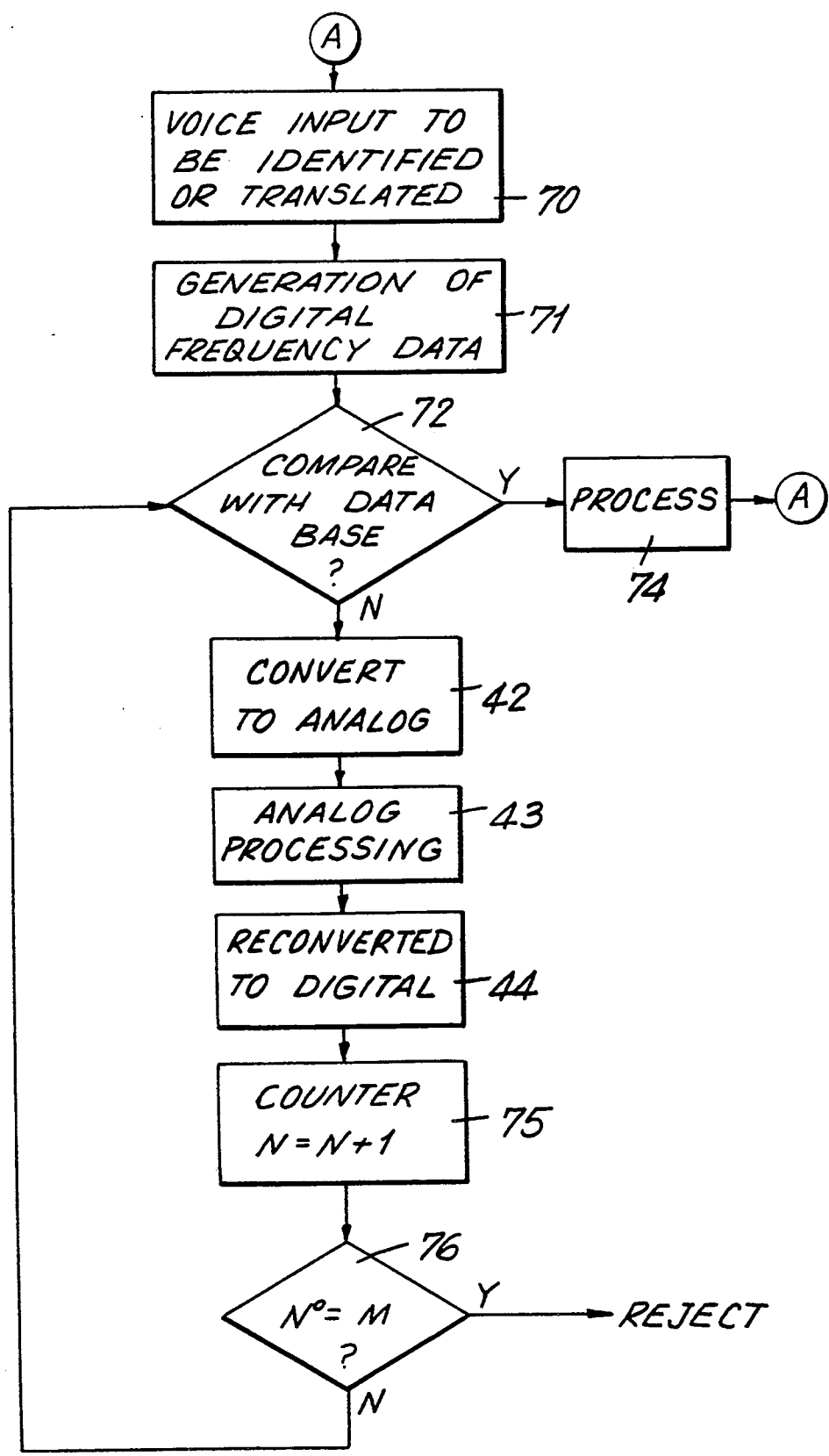
FIG. 7 is a flow diagram of a process in accordance with invention for voice input systems.

FIG. 7 illustrates a more specific embodiment of the process described, for example, with reference to FIG. 3. In this example the invention, the is adapted to recognize input voice signals, or to translate input voice signals into another form such a ASCII code. It is further assumed that the program of the system, and its database, has been prepared for the recognition of specific frequency characteristics of the voice of a given individual, as input at block 70. The input voice signals are converted to digital form representative of the frequency components thereof, at block 71, by conventional means, and these frequency components are compared with the stored frequency components of speech sounds, syllables, etc., of that individual, at block 72. If the frequency components of the input signal match those of the stored data, the program proceeds normally at block 73 to recognize the individual or otherwise process the signals and then return to receive a further input.

On some occasions, however, some frequency components of the voice of the individual may vary, for example due to illness, changes in the teeth, etc. In such an instance, the frequency data stored in the data base may not adequately match that of the input signals for recognition to occur, or for translation of the input signals to occur. In this event, the signals corresponding to the frequency components are converted to analog form at block 42, processed in the analog area at block 43, and reconverted to digital form at block 44. These reconverted signals are then compared with the data base at block 72, and the above procedure is repeated.

If desired, the number or times that modifications are made on given signals may be counted, at block 57, to reject any further processing of those signals after a predetermined number of modifications thereof, at block 76.

The modifications to the frequency component signals introduced by the analog area may be random, as illustrated for example in FIG. 8. Thus, the output of a random frequency generator 80, generating frequency components in a random manner, is converted to analog form at block 81, to introduce a variable into the analog area, to influence the frequency components of the voice signals as output from the analog area in a random manner.

The system in accordance with the invention thus enables the modification of data in a predictable manner, or an unpredictable manner if desired, in order to enable processing of the signals by techniques that are either impossible or not readily possible when the signals are processed solely by digital processing equipment. The resultant perturbations of the signals, which may follow statistical laws, thus enabling the achieving in a simple manner of results that would be difficult to achieve when employing fixed digital processing programs.

FIGS. 9–15 are simplified illustrations of several embodiment of analog areas that may be employed, in accordance with the invention.

Figure 9:
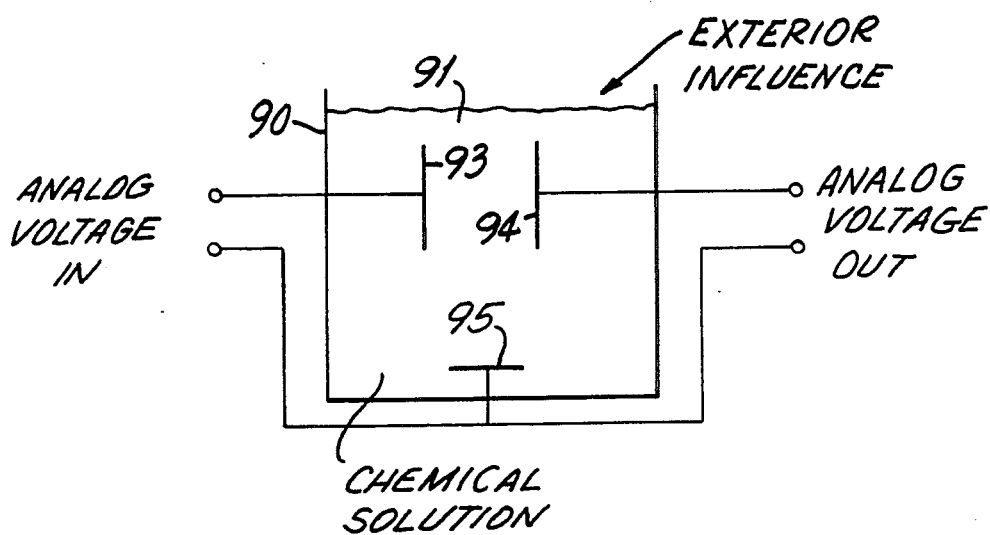
FIG. 9 illustrates a chemical analog area, in accordance with the invention.

In one embodiment of the invention, as illustrated in FIG. 9, a container 90 filled with a chemical solution 91, is provided with an input electrode 93 connected to receive the input analog voltage, an output electrode 94 connected to the analog output, and a reference electrode 95. The characteristics of the chemical solution are varied by a number of factors, such as the voltage at the electrode 93, and exterior influences such as temperature, light, etc., to couple a voltage to the electrode 94.

Figure 10:
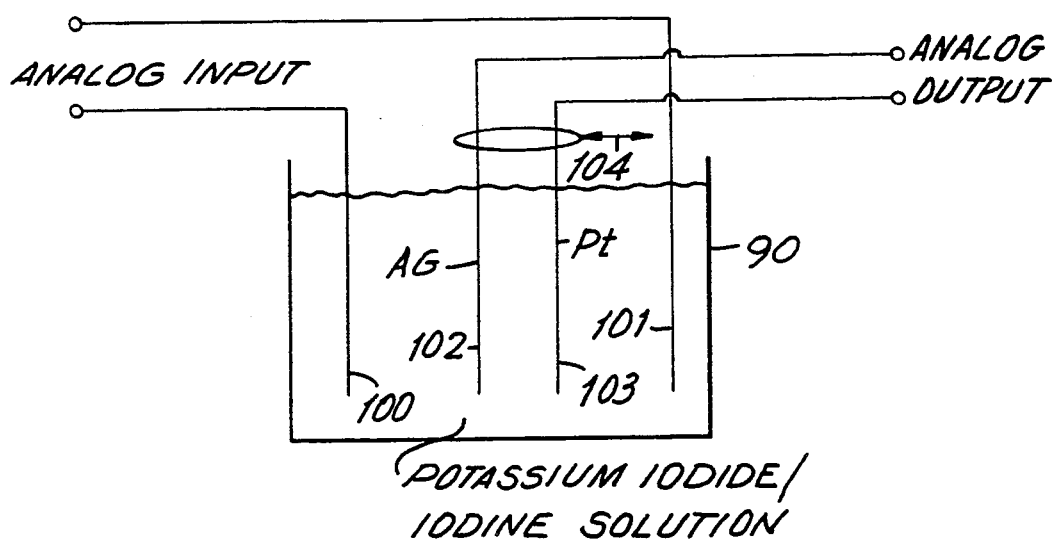
FIG. 10 illustrates a modification of the analog area of FIG. 9.

In a modification of the embodiment of FIG. 9, as illustrated in FIG. 10, the container 90 is filled with a potassium iodide/iodine solution, and the analog input voltage is applied between a pair of spaced electrodes 100,101. The analog output of obtained from a pair of spaced electrodes 102, 103, which may be silver and platinum respectively. If desired, the electrodes 102, 103 may be adapted to be moved in the solution, as indicated by the arrow 104, or additional pairs of such electrodes may be provided at a number of locations in the solution, in order to provide different outputs corresponding to the positions of the electrodes in the solution.

Figure 11:
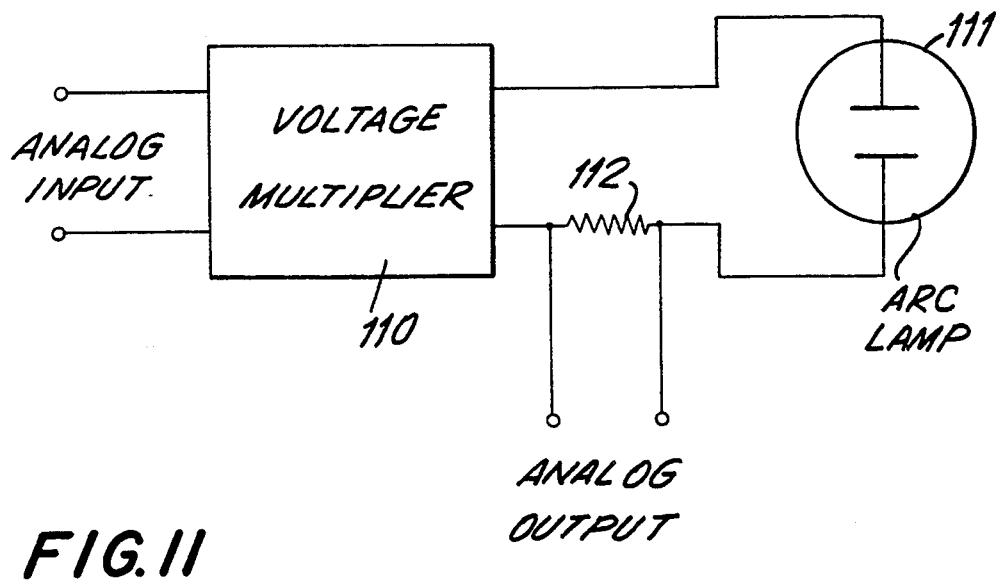
FIG. 11 illustrates an analog area in accordance with the invention that employs an arc lamp.

In the embodiment of the analog area of the invention as illustrated in FIG. 11, the analog input is employed to control the voltage of a voltage multiplier, e.g. a power amplifier, whose output is connected as the source of power for an arc lamp 111. A resistor 112 is provided in the current path of the arc lamp in order to sense an analog output voltage representative of the current flow in the arc.

Figure 12:
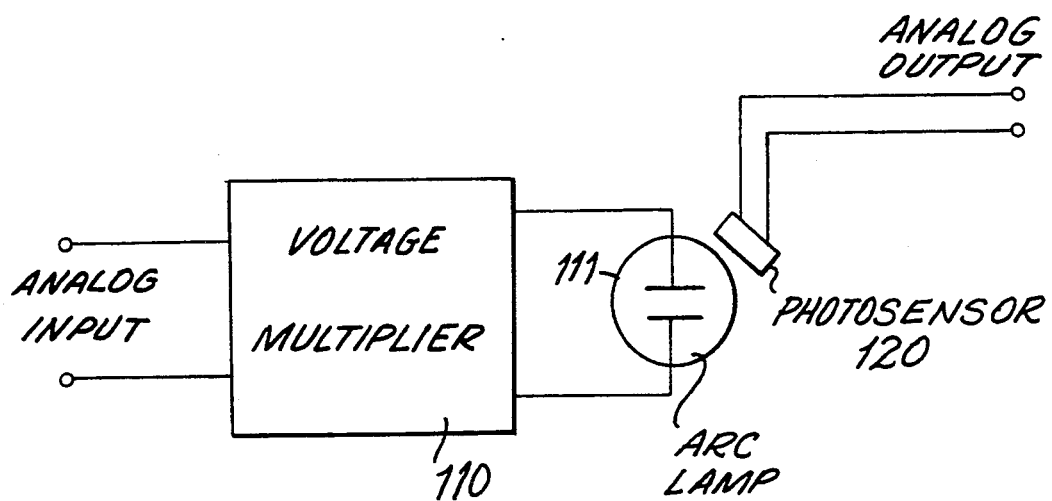
FIG. 12 illustrated a modification of the analog area of FIG. 11

In the modification of the arrangement of FIG. 11, as illustrated in FIG. 12, the output of the analog area is coupled to a photosensor 120 positioned to sense the light output of the arc lamp.

In the embodiment of the analog area illustrated in FIG. 13, the analog input voltage is applied to a silicon light sensor 130, with the analog output voltage being take across a resistor 131 in series with the light sensor. It is of course apparent that other light sensing devices may be employed for the purpose. The analog output is hence a function of the physical characteristics of the sensing device, as well as the analog input and ambient light conditions.

Figure 14:
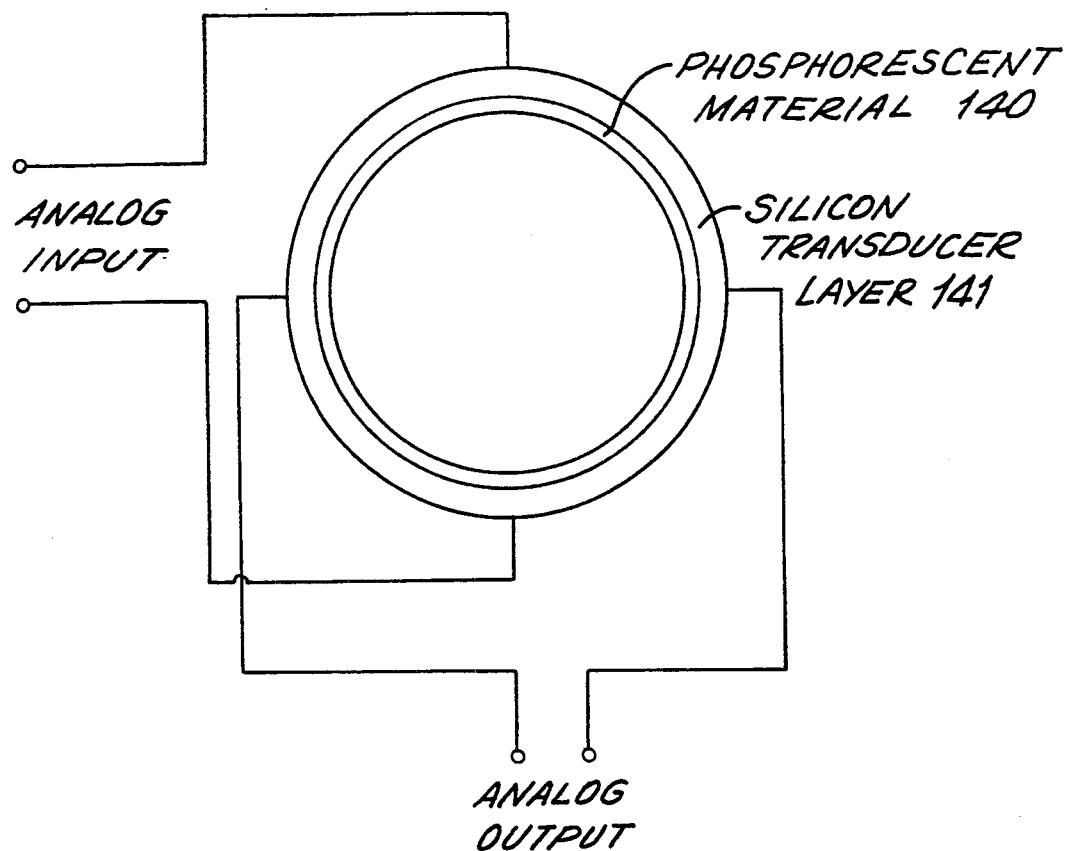
FIG. 14 illustrates an analog area employing a silicon shell.

As illustrated in FIG. 14, a phosphorescent layer 140 is provided inside of a spherical shell 141 defined by a semiconductive silicon transducer layer. The shell is provided with terminals encircling the shell for receiving the input analog signals. This transducer transforms the input energy to energize the phosphorescent substance to glow inside of the spherical shell. This glow is received by the silicon layer to produce an output for application to the microcomputer. The output signals are thus a function of the input signal, as well as the response of the phosphorescent material to the energy produced by the silicon layer and the algorithm of the response of the silicon layer to the glow that is thereby produced. The response of the silicon layer is not be entirely predictable in view of the complexity of the system, as well as the fact that many variable factors are involved.

Figure 15:
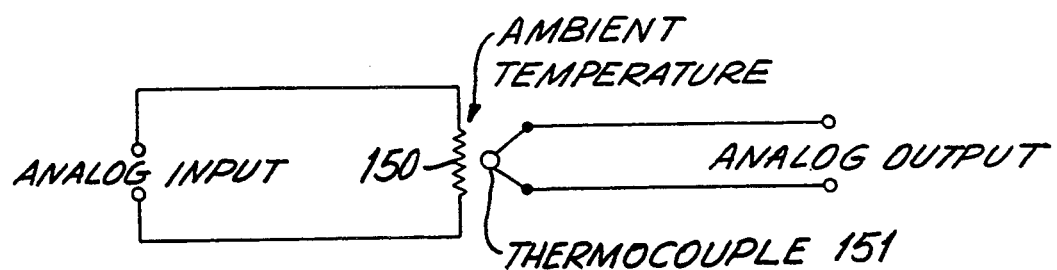
FIG. 15 illustrated an analog area employing a thermocouple.

In a still further embodiment of the analog area, as illustrated in FIG. 15, The analog input voltage is applied to a heating element 150, such as a resistor. The temperature of the element is sensed by a thermocouple 151, to provide the analog output voltage. The output voltage is a function not only of the input analog voltage, but also ambient conditions.

It is of course apparent that other devices may be employed for the analog area, and that the invention is not limited to use of the above disclosed devices. For example, the analog area may employ device using variable magnetic, pneumatic, nuclear, mechanical, thermal, etc. characteristics. Thus, in a magnetic system, input energy may be applied to a develop a magnetic field that is adapted to be influenced be external energy, such as a counter field, with the analog output being a function of a current in the system. In a mechanical system, the position of a mechanical element as a function of time, such as a harmonically movable element, may determine the transfer function of the device.

The analog area device thus has a pass or transfer function for the data or other signals that is dependent upon the device itself, but the function is not necessarily entirely predictable in any given situation in view of the physical nature of the device. The information that comes out of the device is thus different from the information that was applied to it. This change of information represents a variability that enables the microcomputer to process information in a manner that could not have been done if the information were merely digitally modified in accordance with any desired algorithm.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. An information processing system comprising
    a digital computing system,
    an analog processing device comprising an electrical analog signal input, an electrical analog signal output, means for converting electrical information at said analog signal input to analog energy, means for modifying said analog energy, and means responsive to said modified analog energy for producing output electrical information and applying it to said analog signal output, digital-to-analog conversion means for applying output data from said digital computing system to said analog signal input, and analog-to-digital conversion means for converting analog signals at said analog signal output to digital signals and applying said last mentioned digital signals to said digital computing system.

2. The system of claim 1 wherein said means for converting electrical information comprises means for converting electrical information at said analog input to light energy, and said means for producing output electrical information comprises means for converting light energy to electrical energy for application to said analog output.

3. The system of claim 1 wherein said means for converting electrical information comprises means for converting electrical information at said analog input to chemical energy, and said means for producing output electrical information comprises means for converting chemical energy to electrical energy for application to said analog output.

4. The system of claim 1 wherein said means for converting electrical information comprises means for converting electrical information at said analog input to magnetic energy, and said means for producing output electrical information comprises means for converting magnetic energy to electrical energy application to said analog output.

5. A method for processing data comprising
producing first electrical digital data,
converting said first electrical digital data to first electrical analog data,
converting said first electrical analog data to non-electrical energy data, then
modifying said non-electrical energy data, then
reconverting said modified converted energy data to second electrical digital data, whereby said conversion to non-electric energy data and reconverting to second analog data introduce variations in said second electrical digital data as compared with said first electrical digital data.

6. An information processing system comprising
a digital computing system having a memory with data stored therein,
means for applying input data to said digital computing system,
an analog processing device comprising means for converting electrical information received thereby to information of analog form, means for modifying said energy of analog form, and means responsive to said modified energy of analog form for producing output electrical information,
digital-to-analog conversion means for applying analog data to said analog processing system, and
analog-to-digital conversion means for applying said output electrical information to said digital computing system,
said digital computing system comprising means for comparing input data applied thereto with data stored in said memory, and means responsive to a lack of correspondence between said stored and input data for applying said input data to said digital-to-analog conversion means.

7. The information processing system of claim 6 wherein said digital computing system further comprises means for comparing the output of said analog-to-digital conversion means with data stored in said memory.

8. The information processing system of claim 7 further comprising means responsive to a comparison between the output of said analog-to-digital conversion means with said stored data for storing the respective data input to said data processing system in said memory.

9. The information processing system of claim 7 wherein said analog processing device has a predetermined transfer function.

10. The information processing system of claim 7 wherein said analog processing device has a random transfer function.

11. The information processing system of claim 7 wherein said analog processing device comprises chemical energy transfer means.

12. The information processing system of claim 7 wherein said analog processing device comprises electric energy transfer means.

13. The information processing system of claim 7 wherein said analog processing device comprises magnetic energy transfer means.

14. The information processing system of claim 7 wherein said analog processing device comprises mechanical energy transfer means.

15. The information processing system of claim 7 wherein said analog processing device comprises electromagnetic energy transfer means.

16. The information processing system of claim 7 wherein said analog processing device comprises thermal energy transfer means.

* * * * *